CONTROLLED IMPEDANCE BUS BAR

Filed Feb. 29, 1968 3 Sheets-Sheet 1

INVENTOR
ALFRED J. ROCKLITZ

BY Kenneth S. Grace
ATTORNEY

Sept. 9, 1969 A. J. ROCKLITZ 3,466,382

CONTROLLED IMPEDANCE BUS BAR

Filed Feb. 29, 1968 3 Sheets-Sheet 2

United States Patent Office 3,466,382
Patented Sept. 9, 1969

3,466,382
CONTROLLED IMPEDANCE BUS BAR

Alfred J. Rocklitz, St. Paul, Minn., assignor to Sperry Rand Corporation, New York, N.Y., a corporation of Delaware Filed Feb. 29, 1968, Ser. No. 709,259
Int. Cl. H01b *11/06;* H02q *3/02*
U.S. Cl. 174—72 7 Claims

ABSTRACT OF THE DISCLOSURE

A design of and a method of forming a bus bar for an electrical power distribution system of either DC or high-frequency, short-pulse-duration signals. The bus bar utilizes micro-miniature fabrication techniques to achieve a controlled impedance characteristic and is particularly adapted for use with a connector panel assembly utilizing back panel wiring by an automatic Wire-Wrap machine.

Background of the invention

The invention herein described was made in the course of or under a contract or subcontract thereunder with the Department of the Army.

The present invention relates to the electronic art and in particular to that part of the electronic art that relates to the support of the electrical interconnection of modular electronic circuits that are mounted on plug-in type printed circuit boards. As the electronic components utilized in present day electronic data processing systems have, through micro-miniature techniques, been reduced in size, a primary concern is their efficient packaging. As the size and cost of electronic circuits are substantial factors in the design of reliable electronic equipment, electronic engineers have attempted to reduce, to a minimum, the types of electronic circuits, or card types, that are utilized in any specific piece of equipment. These electronic circuits are mounted on plug-in type printed circuit boards of a modular construction providing lowered costs obtainable by mass production techniques while providing higher quality assurance and a greater ease of equipment maintainability.

These standardized modular electronic circuits, or card types, which are mounted on plug-in type printed circuit boards, usually terminate in a plurality of male electrical connectors that are specifically designed to provide electrical interconnection with standard dimensioned female receptacles. The most efficient technique for the support of and the electrical interconnection of such modular printed circuit boards presently involves the utilization of a rather large planar connector panel assembly or mounting panel on which are mounted a plurality of female receptacles or connectors which are arranged in a predetermined pattern. The female receptacles are mounted on the front side of the mounting panel and provide support for and electrical interconnection of the modular electronic circuits that are mounted on the plug-in type printed circuit boards. On the back side of the panel the female receptacles terminate in electrical conductive members that function as wire-wrap pins. The electrical interconnection, or back panel wiring, of these wire-wrap pins is accomplished by a wiring machine such as that produced by the Gardner-Denver Company, Grand Haven, Mich. For discussion of such wiring technique see the publication "Wiring Terminal Panels By Machine," Control Engineering, August 1961, pages 77–81. The control of such a Wire-Wrap machine is preferably under numerical control by a digital computer in an automated manufacturing system such as that disclosed in the copending patent application of J. P. Holmgren et al., Ser. No. 323,969, filed Nov. 15, 1963 (now abandoned), assigned to the Sperry Rand Corporation as is the present invention.

The center-to-center spacing of wire-wrap pins for automatic, or machine wiring, of electronic back panels has been successfuly reduced to 0.10 inch. However, in reducing such spacing to 0.10 excessive wire height build-up has occurred. Wire height build-up has been compounded by one prior art practice of forming bus bars along the back panel by the electrical interconnection of like voltage level wire-wrap pins by individual conductors with the Wire-Wrap machine. Where voltage regulation along the bus bar is critical, due to the limited dimensions of the interconnecting wires, it has been necessary to use a plurality of parallel arranged wire-wrap leads to maintain the proper current carrying capacities. Additionally, as the electrical power distribution system conducts high-frequency, short-pulse-duration signals of precise rise and fall times the distribution system requirements approach that of coaxial cables to provide the necessary controlled low impedance characteristics along the bus bar that distributes the high-frequency, short-pulse-duration signals to the associated wire-wrap pins, and, accordingly, the modular printed circuit boards coupled thereto. Further, the high packing density of the wire-wrap pins and the associated wire-wrap leads permit deleterious noise signals and cross talk signals to be induced in such wire-wrap leads priorly utilized as electrical power distribution system bus bars. Accordingly, it is highly desirable to provide an electrical power distribution bus bar that has the desirable characteristics of a coaxial cable while being of a micro-miniature construction to permit the utilization thereof betwen wire-wrap pins on a back panel having center-to-center spacing of 0.10 inch.

Summary of the invention

The present invention relates to a continuous bus bar for an electronic back panel, or connector plate, that is specifically designed for bank panel wiring by an automatic Wire-Wrap machine under numerical control by an electronic data processing system. The mounting panel functions as an electromagnetic shield or ground plane while having a pattern of holes therethrough in which are inserted or mounted on the front side insulated pass through female connectors. The connectors on the front side serve as mounting means for the male blades of the printed circuit board connectors that are mounted thereon while on the back side serve as wire-wrap pins for back panel wiring by the automated Wire-Wrap machine. The bus bar may include two or more conductive strips; a center signal conducting strip; and, an enveloping U-shaped grounding strip that functions as an electromagnetic shield for the signal strip. The enveloped center signal strip and the enveloping outer grounding strip are insulatively formed into a compact unit with each strip having suitable tabular members for soldering to the associated wire-wrap pins. The controlled cross-sectional dimensions of the bus bar provide controlled impedance characteristics, as in conventional coaxial cable construction, providing a bus bar of a physical size that is suitable for assembly to and between wire-wrap pins on a connector mounting panel assembly.

Description of the preferred embodiment

Figure 1:
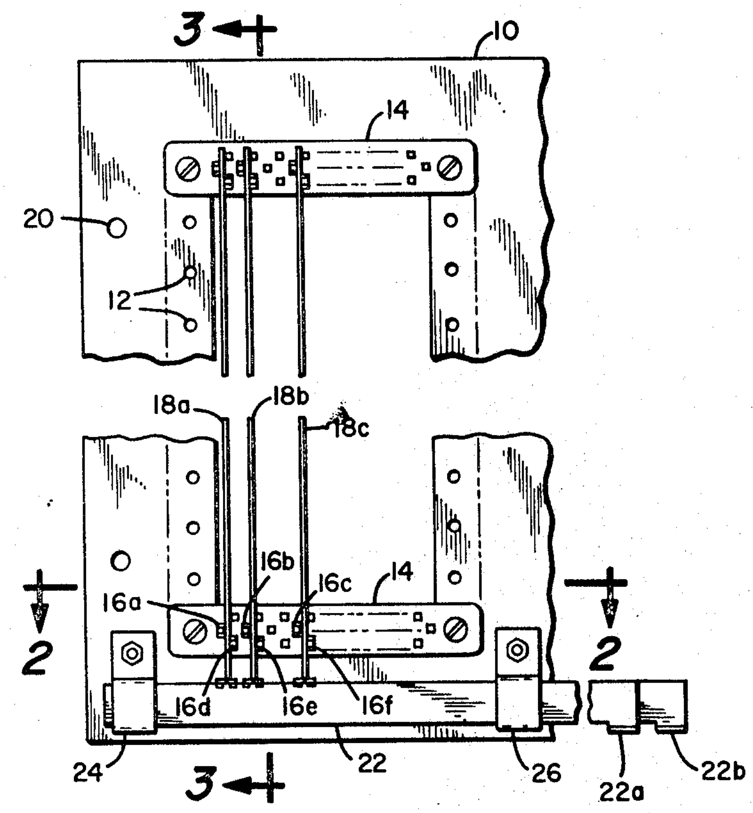
FIG. 1 is a partial plan view of the back-side of a connector panel assembly on which the bus bar of the present invention is incorporated.

With particular reference to FIG. 1 there is illustrated a partial plan view of the back-side of a connector panel assembly on which the bus bar of the present invention is incorporated. Connector panel 10 is, in the preferred embodiment, an aluminum sheet of approximately 0.12 inch thick having a plurality of holes 12 therethrough and by which are mounted on the back-side a plurality of connectors 14. The connectors 14 on the front-side serve as mounting means for the male blades of a printed circuit board 8 connector which is mounted thereon while on the back-side serve as wire-wrap pins 16 for back panel wiring by the automated Wire-Wrap machine. The bus bars 18 are aligned along a respectively associated line of wire-wrap pins 16 of a plurality of aligned connectors 14 so as to conform to the dimensions of the spacing between adjacent wire-wrap pins 16 on each connector 14 and also to conform to the aligned spacing of the plurality of connectors 14. Additionally, connector panel 10 includes a plurality of mounting holes 20 for securing to an appropriate connector panel mounting rack.

Along the bottom on the back side of connector plate 10 there is installed a flexible bus bar 22 which is comprised of a plurality of separate electrical signal and ground conductors **22*a* and 22*b*. Bus bar 22, and its separate conductors 22*a*, and 22*b* is utilized to couple the appropriate signal source to the associated bus bars 18*a*, 18*b* and 18*c*. The separate conductors 2*a* and 22*b*, which may be of shear copper stock of approximately 0.01 inch in thickness, are soldered to the associated signal and ground strips of bus bars 18*a*, 18*b* and 18*c* at their bottom terminals at connecting tabs that will be described hereinafter. Bus bar 22 is affixed to connector panel 10 by means of attaching clips 24, 26 and suitable hardware whereby bus bar 22 is maintained in a substantially fixed relationship with the plurality connectors 14 and, accordingly, bus bars 18*a*, 18*b* and 18*c*. Where a plurality of different signals are required a like plurality of bus bars 22** may be utilized.

Figure 2:
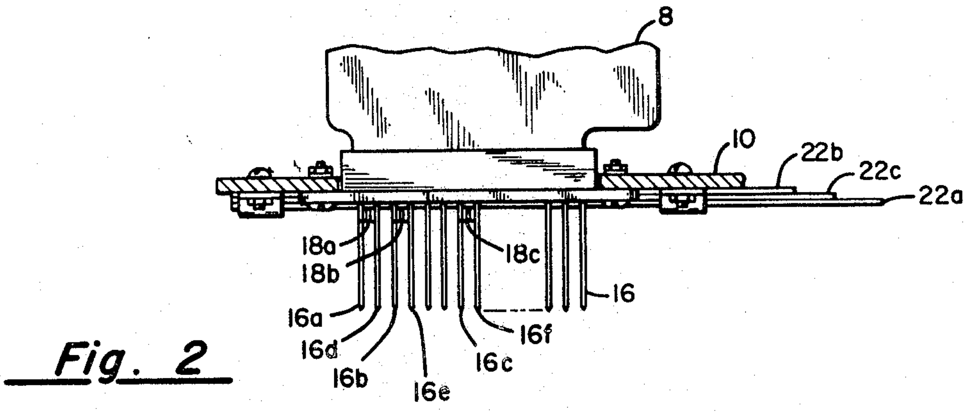
FIG. 2 is a cross-sectional view taken along line 2—2 of FIG. 1.

With particular reference to FIG. 2 there is presented a cross-sectional view taken along line 2—2 of FIG. 1 showing the voltage bus arrangement of bus bars **18*a*, 18*b* and 18*c*; bus bars 18*a*, 18*b* and 18*c* could be staggered in depth along the wire-wrap pins 16 so as to accommodate the associated conductors 22*a*, 22*b* and an insulating strip 22*c* of a like plurality of bus bars 22. In this embodiment wire-wrap pins 16*a*, 16*b* and 16*c* function as the ground potential for the grounding strips of bus bars 18*a*, 18*b* and 18*c*. Alternatively, wire-wrap pins 16*d*, 16*e* and 16*f* function as the source of signal potential for the associated signal strips of the associated bus bars 18*a*, 18*b* and 18*c*. Subsequent discussion herein relating to the detailed discussion of the construction of such bus bars 18 shall more fully define the constructional relationship of the grounding strip and the signal strip of bus bars 18**.

Figure 3:
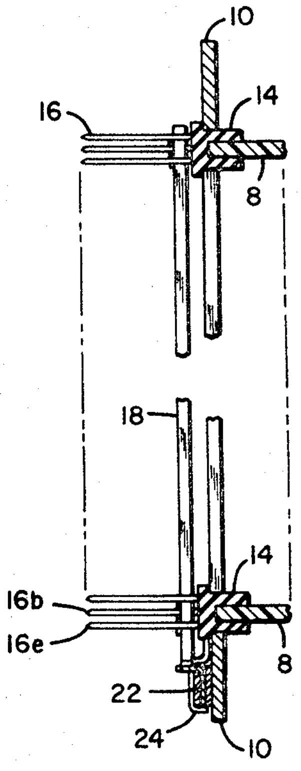
FIG. 3 is a cross-sectional view taken along line 3—3 of FIG. 1.

With particular reference to FIG. 3 there is presented a cross-sectional view taken along line 3—3 of FIG. 1 illustrating the arrangement of a voltage bus 18 along the plurality of aligned connectors 14. This view particularly illustrates that a bus bar 18 couples bus bar 22 to the respective associated wire-wrap pins 16 along the plurality of aligned connectors 14.

Figure 4:
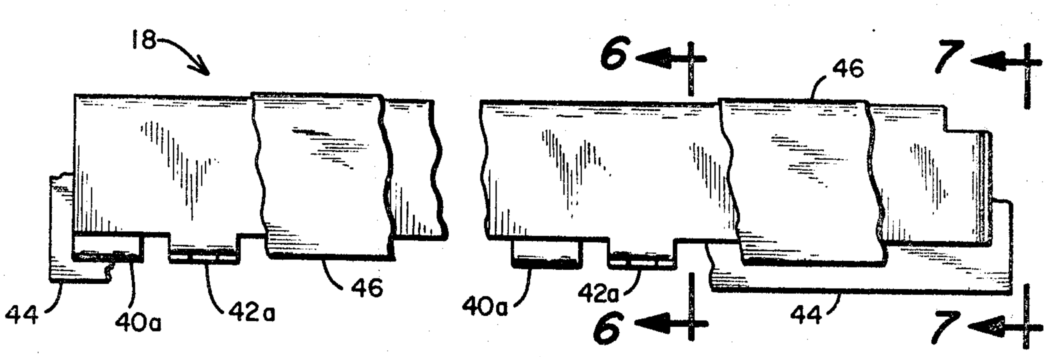
FIG. 4 is a side view of the bus bar of the present invention.

With particular reference to FIG. 4 there is presented a side view of the bus bar 18 of the present invention. Bus bar 18 includes two conductive strips; a center signal strip 40, and, an enveloping U-shaped grounding strip 42 that functions as an electromagnetic shield for signal strip 40. The enveloped center signal strip 40 and the enveloping outer grounding strip 42 are insulatively formed into a compact unit with each strip having suitable tabular members **40*a*, 42*a*, respectively, for soldering to the associated wire-wrap pins 16 of connectors 14 of the connector panel assembly of FIG. 1. Signal strip 40 and grounding strip 42 are insulatively separated, one from another, by a center insulating strip 44 while the bus bar 18, except for its extending tabular members, 40*a*, 40*b*, 42*a* and 42*b*, is insulatively enveloped by an encapsulating strip 46. The tabular members 40*a*, 42*a* are longitudinally spaced along the bottom of bus bar 18 to conform to the dimensions of the associated wire-wrap pins 16 of the plurality of aligned connectors 14** of the connector panel assembly of FIG. 1.

Figure 5:
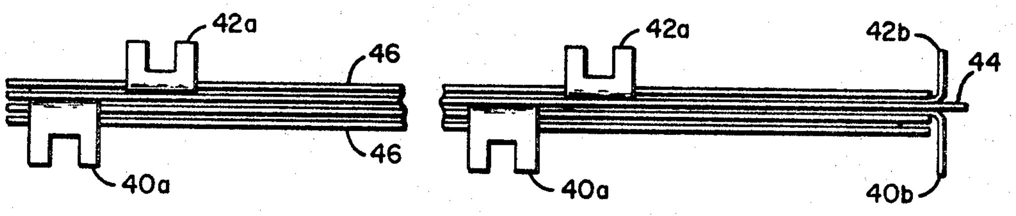
FIG. 5 is a bottom view of the bus bar of the present invention.

With particular reference to FIG. 5 there is presented an illustration of a bottom view of the bus bar of the present invention. This view particularly illustrates the spaced relationship of the tubular members **40*a*, 42*a* of center strip 40 and grounding strip 42, respectively, along the longitudinal axis of bus bar 18 so as to conform to the spacing of the wire-wrap pins 16 of connector panel assembly of FIG. 1. Additionally, this view particularly illustrates end tabular members 40*b*, 42*b*, of center strip 40 and grounding strip 42, respectively, for a soldered attachment to signal bus 22*a* and ground bus 22*b* of bus bar 22 illustrated in FIG. 1. Each bus bar 22 is, as discussed above, comprised of two conductive members 22*b*, 22*a* that function as a primary distribution means for ground potential and signal potential, respectively. Such conductors 22*a*, 22*b* have tabular members dimensionally corresponding to tabular members 40*b*, 42*b* whereby each bus bar 18 signal strip 40 and grounding strip 42 are solder-coupled to the corresponding conductors 22*a*, 22*b* of a bus bar 22**.

Figure 6:
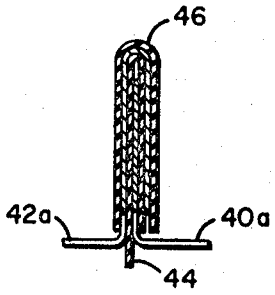
FIG. 6 is a cross-sectional view taken along line 6—6 of FIG. 4.

With particular reference to FIG. 6 there is presented a cross-sectional view of bus bar 18 of the present invention taken along line 6—6 of FIG. 4. This cross-sectional view is particularly presented to illustrate the insulative relationship of the enveloping U-shaped grounding strip 42 and and the center signal strip 40. As illustrated therein grounding strip 42 and insulating strip 44 are formed into a U-shaped configuration about center strip 40 whereby insulating strip 44 insulates grounding strip 42 from center strip 40 on both adjacent sufaces thereof. Additionally, encapsulating strip 46 is shown conforming to the outer U-shaped conformation of grounding strip 42 whereby bus bar 18, except for its tabular members **40*a*, 42*a*, 40*b*, 42*b*, is substantially enveloped by encapsulating insulative strip 46. Conductive strips 40, 42 and insulative strips 44, 46** are preferably coated on the opposing mating surfaces thereof with a suitable adhesive whereby such members, after assembly, form an integral unit.

Figure 7:
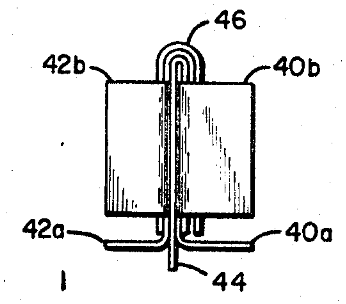
FIG. 7 is an end view of the bus bar of the present invention taken along line 7—7 of FIG. 4.

With particular reference to FIG. 7 there is presented an end view of bus bar 18 of the present invention taken along line 7—7 of FIG. 4. This view is taken to particularly illustrate the relationship of tabular members **40*b*, 42*b* which are specifically designed for a soldered connection to corresponding tabular members of conductive strips 22*a* and 22*b* of bus bar 22** of FIG. 1.

In a preferred embodiment of the present invention bus bar 18 had an over-all height, from tabular members **40*a*, 42*a* to the apex of encapsulating strip 46 as illustrated in FIG. 6, of 0.140 inch and an over-all thickness across the two legs of encapsulating strip 46 of 0.022 inch. Spacing of associated pairs of tabular members 40***a*, 42*a* along the longitudinal axis of bus bar 18 was 0.10 inch with the notches therein of proper dimensions to accommodate 0.025 inch square wire-wrap pins 16 of each receptacle 14 spaced 0.10 inch along the longitudinal axis of bus bar 18 and 0.075 inch across the longitudinal axis of bus bar 18. This embodiment provided a bus bar 18 having a characteristic impedance $Z_0$ of 2 ohms.

Figure 8:
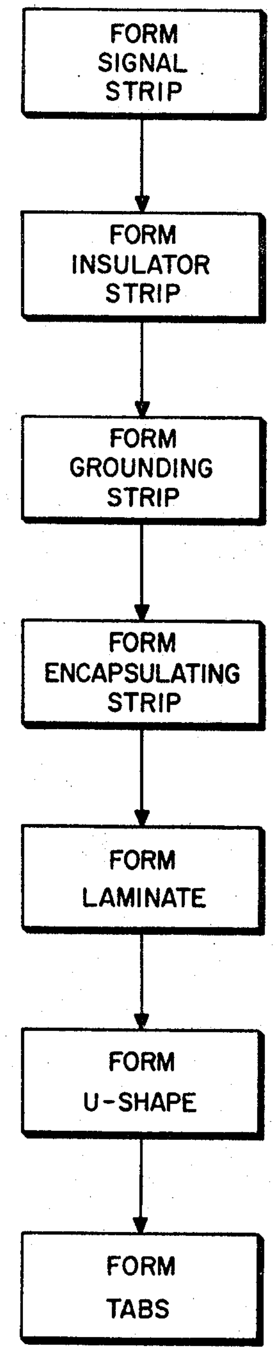
FIG. 8 is a flow diagram illustrating a typical series of steps that may be followed in preparing a bus bar in accordance with the preferred technique of the present invention.
Figure 9:
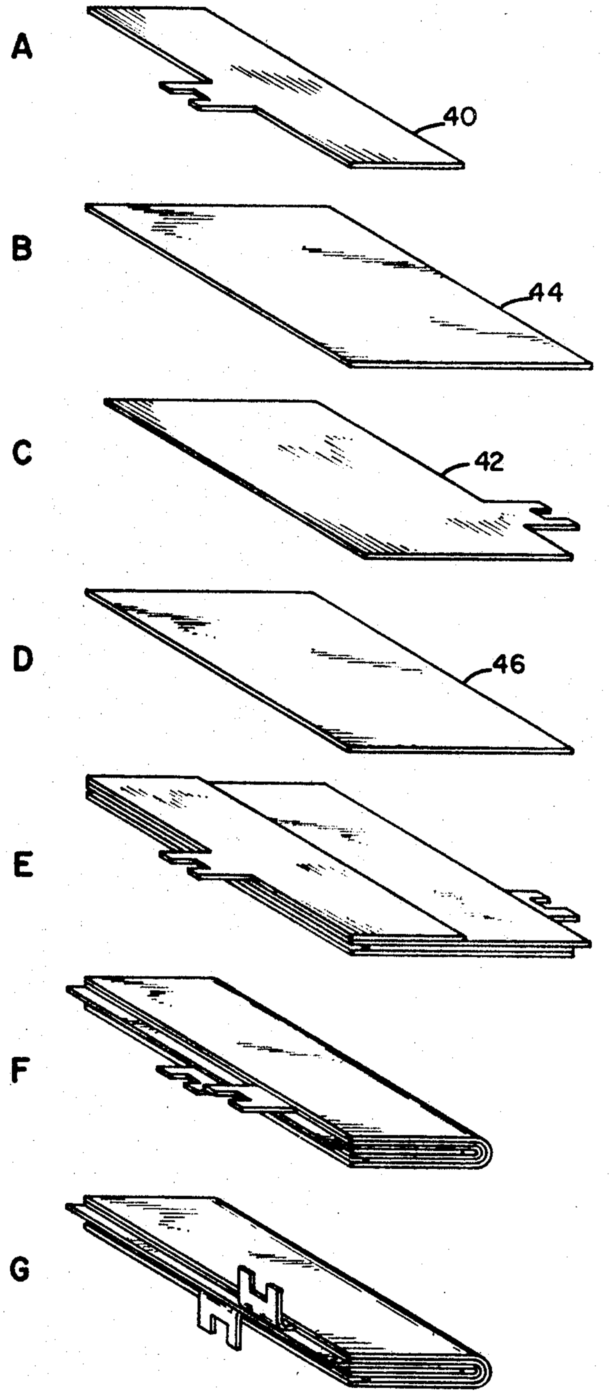
FIG. 9 is a series of view illustrating a typical production bus bar that is under preparation in accordance with the technique of FIG. 8, the various figures illustrating the apparatus progressively in various stages of its production and corresponding to the steps that are indicated adjacently in the flow diagram of FIG. 8.

Discussion of an exemplary method of fabrication of the bus bar proposed by the present invention shall proceed with reference to FIGS. 8 and 9. FIG. 8 illustrates a flow diagram of a series of steps that may be followed in preparing the bus bar in accordance with a preferred technique of the present invention. FIG. 9 illustrates progressively the appearance of the product of this invention during various stages of this fabrication. Each of the illustrations of FIG. 9 is located adjacent the step during which it is formed, as seen in the flow chart of FIG. 8.

As is indicated by the flow chart of FIG. 8, the preferred method of practicing the illustrated embodiment of the present invention commences with the forming or fabrication of signal strip 40 at step A. The signal strip may be formed in accordance with methods well-known in the art and here is preferably formed of shear copper stock of 0.0056 inch in thickness.

The next step B of the present invention is the forming of insulator strip 44. In the preferred embodiment of the present invention the insulator strip is formed of a polyimide film of 0.001 inch in thickness. In an alternative method, a sheet or film of suitable insulating material, such as polyethylene terephthalate, or Mylar, may be utilized.

The next step C of the present invention is the forming of grounding strip 42. The grounding strip may be fabricated by any of the many well-known methods that may be utilized to fabricate the signal strip, and, additionally, in the preferred embodiment of the present invention is of the same material.

The next step D of the present invention is the forming of encapsulating strip 46. The encapsulating strip may be formed by any of the many well-known methods utilized to fabricate the insulator strip and, additionally, in the preferred embodiment of the present invention is of the same material.

The next step E of the present invention is the applying of a suitable adhesive to insulating strip 44 and encapsulating strip 46 and the forming of a laminated structure including the elements formed in steps A, B, C and D above. The laminated structure is preferably placed between a suitable clamping means for a sufficient period of time to permit the elements thereof to form an integral element of a predetermined thickness.

The next step F of the present invention is the forming, or bending, of the elements of steps B, C and D above about the element of step A above whereby there is formed a U-shaped structure with the element of step D above forming a protective, or insulative, member thereabout. The element of step B above is formed of such a dimension as to extend above the open legs of the U-shaped element of step C above whereby the tabs on the elements of steps A and C above are insulatedly separated by the extended portion of the element of step B above.

The next step G of the present invention is the forming of tabs 40*a*, 42*a* on the elements of steps A and C above at an angle of 90 degrees to the plane of the U-shaped assembly for the forming of predetermined, spaced-apart, electrical conductive members that are integral with the associated elements of steps A and C above.

Where required, a next step may consist of the forming of tabs 40*b*, 42*b* on the elements of steps A and C above at an angle of 90 degrees to the plane of the U-shaped assembly as illustrated in FIGS. 4, 5 and 7.

Many alternative embodiments of the present invention should be immediately apparent to the skilled design engineer. Such alternative embodiments would include fabricating the elements of steps A, B, C and D above of any of various appropriate materials. Such modifications might include the fabrication of the elements of steps A and C above of any suitable conductive material such as aluminum or silver while the elements of steps B and D above may be of any suitable material having the necessary insulative iand electrical characteristics. Additionally, the elements of steps B, C and D above may be of a longer dimension along the longitudinal axis of the U-shaped assembly whereby such elements may be compressed, or pinched, for the insulation of the element of step A above at its end portions. Additionally, step D above may be eliminated and the so-formed U-shaped assembly may be encapsulated by dipping, spraying, etc. an insulating layer about all the external surfaces thereof except the electrical conductive tabs. A still further embodiment would include the forming of the elements of steps A, B and C above of a double copper clad insulative center substrate wherein the elements of steps A and C above are etched, by well-known techniques, to the desired form.

Thus, it is apparent that the applicant has illustrated a preferred embodiment of the present invention wherein there is disclosed a design of and a method of forming a bus bar for an electrical power distribution system of high-frequency, short-pulse-duration signals that is particularly adapted for use with back panel wiring by an automatic Wire-Wrap machine.

Having now, therefore, fully illustrated and described my invention, what I claim to be new and desire to protect by Letters Patent is set forth in the appended claims.

1. A bus bar for the distribution of DC to high-frequency, short-pulse-duration signals along aligned, mating, wire-wrap pins on a connector panel assembly, which bus bar utilizes micro-miniature fabrication techniques to achieve a controlled impedance characteristic, comprising:

a center conducting signal strip having a plurality of tabular members extending from one longitudinal edge;

an outer conducting grounding strip having a plurality of tabular members extending from one longitudinal edge;

an outer conducting grounding strip having a plurality of tabular members extending from one longitudinal edge;

an insulating strip;

said insulating strip and said grounding strip formed in a U-shaped configuration about said signal strip;

said insulating strip insulating said grounding strip from said signal strip;

the tabular members of said signal and grounding strips extending in opposite directions from the planes of said strips and aligned along their respective longitudinal edges to conform to the spacing of mating wire-wrap pins on a connector panel assembly; and, an encapsulating strip formed in a U-shaped configuration about said grounding strip.

2. The bus bar of claim 1 wherein said insulating strips and said conducting strips are adhesively formed into an integral assembly.

3. The bus bar of claim 1 wherein said insulating strips are of a sheet stock of approximately 0.001 inch in thickness.

4. The bus bar of claim 3 wherein said conducting strips are of a copper sheet stock of approximately 0.0056 inch in thickness.

5. The bus bar of claim 1 wherein the tabular members of said conducting strips conform to a center-to-center spacing of said mating, wire-wrap pins along said longitudinal edges of approximately 0.10 inch.

6. The bus bar of claim 1 wherein said conducting strips each further include a tabular member on like ends, which tabular members extend in opposite directions from the planes of the associated conducting strips and said insulating strip extends therebetween.

7. The bus bar of claim 1 having a characteristic impedance $Z_0$ of approximately 2 ohms.

References Cited

UNITED STATES PATENTS

| | | | |
|---|---|---|---|
| 3,162,717 | 12/1964 | Lentz | 174—36 |
| 3,189,847 | 6/1965 | Rymaszewski et al. | 174—117 X |
| 3,264,403 | 8/1966 | Erdle. | |
| 3,396,230 | 8/1968 | Crimmins. | |

LARAMIE E. ASKIN, Primary Examiner

U.S. Cl. X.R.

174—36, 117